ABSTRACT OF THE DISCLOSURE

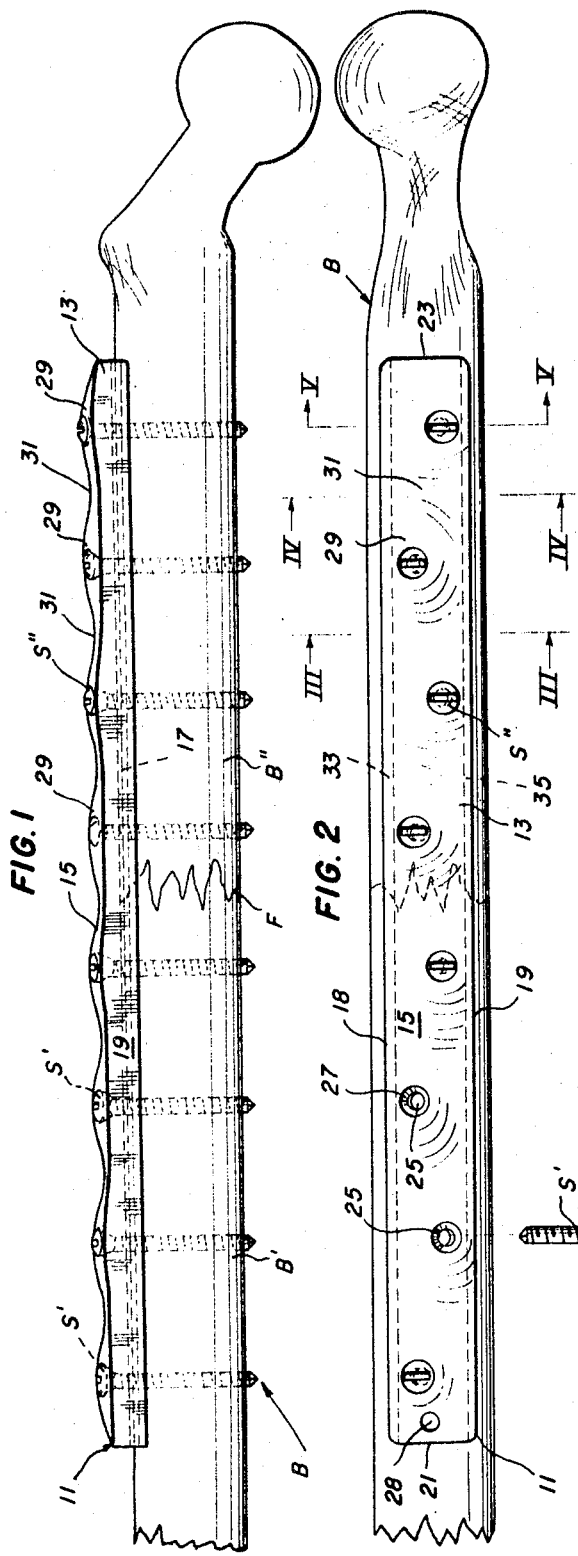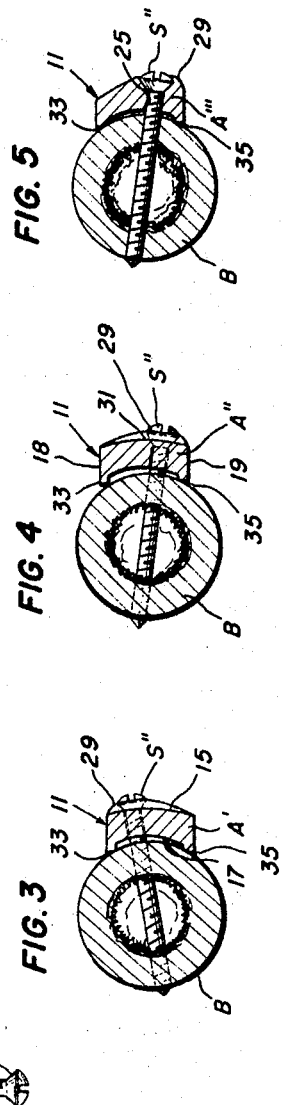
INVENTOR.
HARRY T. TREACE
BY John R. Walker, III
Attorney 3,463,148
BONE PLATE
Harry T. Treace, Germantown, Tenn., assignor, by mesne assignments, to Richards Manufacturing Company, Inc., a corporation of Delaware
Filed Jan. 20, 1966, Ser. No. 521,853
Int. Cl. A61f 5/04, 13/06
U.S. Cl. 128—92          10 Claims

Bone plate means for bone fracture fixation including an apertured bone plate and screws adapted to extend through the plate to secure clampingly the bone and plate together. The bone plate being generally thick and bar-like in form and having flattened conelike structure protruding upwardly about each aperture of the plate for reinforcing the plate at each aperture. The cross sectional area in structure of the bone plate being substantially constant at least along the medial portion of the full length of the plate for resisting lateral flexing and breaking of the bone plate.

---

This invention relates to an improved bone plate adapted particularly for bone fracture fixation.

The commonly used bone plate of the above-mentioned type comprises an elongated piece of metal that is curved in its transverse dimension to fit the bone curvature and which is provided with a plurality of spaced holes along the length of the bone plate. In using bone plates of this type, it has been a recent practice for the orthopedic surgeon to place the bone plate across the fracture, attach one end of the bone plate to one of the broken pieces of bone by means of screws or the like extending through the holes in the bone plate, compressing the bone together at the break by pulling on the unattached end of the bone plate with a compression device, and fastening the unattached end to the other piece of bone by means of screws or the like. There have been a number of problems with these prior bone plates, among them being the following: There has been the problem of the bone plate's breaking when in use, as for example, if weight or stresses were placed on the bone plate because of activity by the patient before the bone healed. These breaks usually occurred nearest the holes in the bone plate due to stresses and weaknesses in this area across the holes. In other words, the space at the holes reduced the cross-sectional area of the bone plate across the holes as compared with the cross-sectional area of the bone plate intermediate the holes so that the break occurred at its weakest point across the holes. Another problem in the use of transversely curved bone plates was the necessity for the selection of exactly the right size bone plate for a particular bone. In other words, the transverse curvature of prior bone plates had to conform exactly to the curvature of the bone. An additional problem concerned the disturbing of the periosteum by the bone plate. The present invention is directed towards overcoming the above-mentioned and other problems in bone plates.

Thus, one of the objects of the present invention is to provide an improved bone plate which has substantially constant or continuous strength from one end of the bone plate to the other so that the tendency of the bone plate to break at the holes is eliminated and a stronger bone plate is provided.

A further object is to provide a one plate which has a substantially constant cross-sectional area from one end thereof to the other.

A further object is to provide a bone plate that has a pair of rib-like feet projecting downwardly along opposite side edges of the bone plate in parallel relationship for engaging the fractured bone, whereby less periosteum is disturbed than was heretofore possible, the bone plate is kept from rocking, is adaptable to more diameters of bone than was heretofore possible, and acts to hold the bone in better alignment particularly during the compression thereof by the compression device heretofore mentioned.

A further object is to provide such a bone plate in which the upper surface is smooth and sinuous with the highest portions thereof being adjacent the holes through the highest portions thereof being adjacent the holes through the bone plate and having lower portions between the holes.

A further object is generally to improve the design and construction of bone plates.

The means by which the foregoing and other objects of the present invention are accomplished and the manner of their accomplishment will be readily understood from the following specification upon reference to the accompanying drawing, in which:

FIG. 1 is a side elevational view of the bone plate of the present invention shown in conjunction with a fractured bone after the fracture has been reduced.

FIG. 2 is a top plan view of that shown in FIG. 1.

FIG. 3 is a sectional view taken as on the line III—III of FIG. 2.

FIG. 4 is a sectional view taken as on the line IV—IV of FIG. 2.

FIG. 5 is a sectional view taken as on the line V—V of FIG. 2.

Referring now to the drawings in which the various parts are indicated by reference characters, the letter B represents the bone that has been fractured as at F to divide the bone into two pieces B' and B". The numeral 11 indicates the bone plate of the present invention which is attached to bone piece B' by means of screws S' with the bone plate overlying the fracture F and extending across the end of bone piece B" where it is attached thereto as by means of the screws S".

Referring now in more detail to bone plate 11 of the present invention, it comprises an elongated body 13 which is preferably formed from a single piece of rigid metal, such as stainless steel. Body 13 is preferably defined on the outside thereof by an upper surface 15; a lower surface 17; opposite sides 18, 19; and opposite ends 21, 23.

Body 13 is provided with a plurality of holes 25 therethrough extending through upper and lower surfaces 15, 17. The holes 25 are preferably staggered along the length of the bone plate 11 as best seen in FIG. 2, and are preferably equally spaced. In addition, the holes 25 are preferably slightly angled inwardly, as best seen in FIGS. 3, 4 and 5. In other words, the holes 25 on one side of the bone plate 11 are angled in one direction, as seen in FIG. 3, and those holes on the opposite side of the bone plate are angled in the opposite direction, as best seen in FIGS. 4 and 5 so that the screws S' and S" extending therethrough will project substantially towards the center of the bone. The holes 25 are preferably countersunk at upper surface 15 as at 27 to accommodate the heads H of the screws S', S". Additionally, a hole 28 is provided in one end of bone plate 11 for use with a compression device in a manner well known to those skilled in the art.

Body 13 is preferably solid except for the holes 25, 28. Lower surface 17 is preferably concave in its transverse dimension, as best seen in FIGS. 3, 4, and 5 and is preferably straight in its longitudinal dimension, as best seen in FIG. 1. Sides 18, 19 are substantially straight and parallel as best seen in FIG. 2. Upper surface 15 is smooth and sinuous with the highest or built-up portions 29 being adjacent holes 25 and lower or depressed portions 31 being substantially halfway between the holes. This upper surface 15 is contoured in the above-mentioned manner so that the cross-sectional area is constant from one end of the bone plate 11 to the other. Thus, the area A′ shown in FIG. 3 is equal to the area A″ shown in FIG. 4 and the area A‴ shown in FIG. 5, and is equal to the area in any other place taken along the length of the bone plate. Stated another way, the upper surface 15 protrudes upwardly adjacent holes 25 to establish the built-up portions 29 which make up for the loss of cross-sectional area due to holes 25 in order to maintain a substantially constant cross-sectional area along the length of the bone plate 11. By this uniquely contoured upper surface 15 a substantially continuous strength bone plate is provided. In other words, the bone plate 11 is as strong across a hole, as for example, on the line V—V of FIG. 2 as in any other place across the bone plate. Thus, the tendency of the bone plate to break across the holes, as in previous bone plates, has been eliminated with the use of the bone plate of the present invention.

Another important feature of the present invention resides in the following construction: Bone plate 11 comprises a pair of rib-like feet 33, 35 projecting downwardly along opposite side edges of lower surface 17. Feet 33, 35 are straight and parallel with one another and are adapted to engage the bone as best seen in FIGS. 1, 3–5. Feet 33, 35 are preferably formed integrally with body 13 and project downwardly below upper surface 17 for substantially the same distances.

From the foregoing, it will be understood that the feet 33, 35 provide means whereby less periosteum is disturbed since only the feet contact the periosteum and the lower surface 17 is held away from the periosteum. This is in contrast to prior bone plates in which substantially the entire lower surfaces thereof contacted the periosteum. In addition, it will be seen that since there is a double contact support by the feet 33, 35 as opposed to an entire lower surface support, the bone plate 11 is adaptable to more diameters of bone and does not rock on the bone. Additionally, the feet 33, 35 during the compression procedure in which the bone pieces B′, B″ are pulled together, act to hold the bone pieces in better alignment. In other words, the feet 33, 35 act somewhat like the runners of a sled in keeping the sled straight as opposed to the action of previous arcuately shaped bone plates which do not have ribs and which can be compared to the lack of alignment or guidance in an arcuate bottomed bobsled.

Although the invention has been described and illustrated with respect to a preferred embodiment thereof, it is to be understood that it is not to be so limited since changes and modifications may be made therein.

I claim:

1. A bone plate for attaching to a fractured bone comprising an elongated rigid bar-like body having an upper surface, a lower surface, opposite sides, and opposite ends, said body being provided with a plurality of holes each bore-like and extending vertically and in a plane lying transverse to the longitudinal axis of said body and intersecting said upper and lower surfaces, said body having protruding areas of increased thickness measured in a direction between said upper and lower surfaces which completely encircle said plurality of holes to make up for the loss in cross-sectional area due to said holes, thereby maintaining a substantially constant cross-sectional area in structure from one end thereof to the other and throughout the full length of said body.

2. The bone plate of claim 1 in which said sides are substantially straight and parallel, said lower surface is concave in its transverse dimension and straight in its longitudinal dimension, and in which said upper surface protrudes upwardly adjacent said holes to make up for the loss for cross-sectional area due to said holes so as to maintain said substantially constant cross-sectional area.

3. The bone plate of claim 1 which includes a pair of rib-like feet projecting downwardly along opposite side edges of said lower surface in parallel relationship to engage the fractured bone.

4. The bone plate of claim 1 in which said upper surface is smooth and sinuous with the highest portions thereof being adjacent said holes and having lower portions thereof intermediate said holes.

5. A bone plate for attaching to a fractured bone comprising an elongated metallic body and bar-like in form and having an upper surface, a lower surface, opposite sides and opposite ends, said body being provided with smooth bore-like holes therethrough extending through said upper and lower surfaces, said sides being substantially straight and parallel, said lower surface being arcuate in its transverse dimension and straight in its longitudinal dimension, said upper surface being smooth and sinuous and being contoured with the highest portions thereof being adjacent and completely encircling said holes to make up for the loss of cross-sectional area due to said holes and to maintain the cross-sectional area of said body substantially constant, and a pair of rib-like feet projecting downwardly along opposite side edges of said lower surface in parallel relationship to engage the fractured bone.

6. Bone plate means adapted for securement on a fractured bone with a plurality of threaded screws for supporting the bone at the fracture comprising an elongated horizontal bar-like vertically apertured bone plate having an upper surface, a lower surface, opposite sides, and opposite ends, the apertures of said bone plate being substantially uniformly intermittently arranged along the length of said plate, the structure of said plate being such that at least along the medial portion of the full length of said plate, and along such medial portion including at least two apertures, the cross sectional area in structure is substantially constant and is of such material and configuration as to resist flexing of said plate substantially uniformly along said medial portion, said medial portion being defined by areas of increased thickness measured in a direction between said upper and lower surfaces which completely encircle said apertures to make up for the loss in cross-sectional area due to said apertures, the plate being adapted to be secured lengthwise to said bone by means of a plurality of threaded screws with said medial portion being rigidly secured over the fractured portion of said bone.

7. The bone plate means of claim 6 in which the cross sectional area instructure of said bone plate is substantially constant throughout the full length of said bone plate and is of such material and configuration as to resist flexing of said plate substantially uniformly along the full length of said bone plate.

8. The bone plate means of claim 6 wherein each bone plate aperture is defined substantially by a smooth generally cylindrical bore-like surface, said surface being adapted to receive and guidingly constrain a screw of said bone plate means.

9. The bone plate means of claim 6 in which said bone plate includes structure defining a transversely longitudinally uniform channel-like surface extending the full length of said plate and includes structure defining a parallel arranged rib-like pair of foot portions extending respectively along opposite marginal portions of said channel-like lower surface and substantially along a common horizontal plane; said plate being adapted to be secured to said bone substantially with said pair of rib-like foot portions lengthwise correspondingly engaging said bone and with said channel-like lower surface being substantially clear and spaced from that portion of the bone surface disposed between said rib-like feet.

10. The bone plate means of claim 9 wherein said bone plate is defined in part by oppositely facing side surfaces each extending straight and substantially the full longitudinal extension of said bone plate and includes a generally sinuous or wavy upper surface with the highest surface portion of each wave being substantially coincident with an aperture of said bone plate, the cross sectional structure of said bone plate protruding upwardly somewhat cone-like about each aperture for strengthening the bone plate at each aperture.

References Cited

UNITED STATES PATENTS 1,105,105   7/1914   Sherman.

FOREIGN PATENTS 451,868   10/1948   Canada.
742,618   1/1933   France.

OTHER REFERENCES

"An Improved Bone Clamp and a Plate for Internal Fixation of Fractures" by J. Verbrugge, M.D., The Journal of Bone and Joint Surgery, vol. 28, No. 1, January 1946, pp. 174–175.

Advertisement by Wright Manufacturing Co., in The Journal of Bone and Joint Surgery, vol. 47–A, No. 5, July 1965, p. 41.

Zimmer Orthopedic and Fracture Equipment Catalog, Zimmer Mfg. Co., Warsaw, Ind., 1950, received in U.S. Patent Office Mar. 23, 1954, Sherman Type SMO Plates shown on p. 118.

RICHARD A. GAUDET, Primary Examiner

RONALD L. FRINKS, Assistant Examiner